Figure 2:
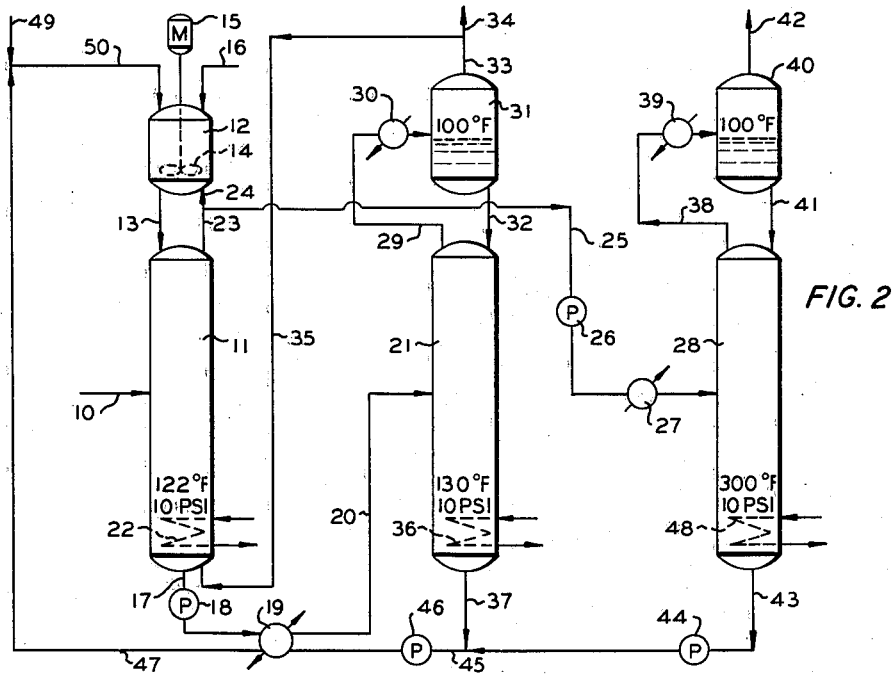

March 7, 1961     G. L. EDMISTON     2,974,174

SOLVENT EXTRACTION PROCESS

Filed Nov. 3, 1958

INVENTOR.
G.L. EDMISTON

BY Hudson and Young

ATTORNEYS

United States Patent Office 2,974,174
Patented Mar. 7, 1961

2,974,174
SOLVENT EXTRACTION PROCESS

Gilbert L. Edmiston, Ponca City, Okla., assignor to Phillips Petroleum Company, a corporation of Delaware Filed Nov. 3, 1958, Ser. No. 771,258
5 Claims. (Cl. 260—631)

This invention relates to the separation of alcohols and ketones by liquid-liquid extraction using a water-containing solvent. In one of its specific aspects the invention relates to the separation of cyclic alcohols and cyclic ketones by liquid-liquid extraction with a solvent comprising an aqueous mixture of a polyhydroxy alcohol.

Cyclic alcohols and ketones, particularly cyclohexanol and cyclohexanone, are of considerable commercial importance. These compounds are usually produced from the corresponding cycloparaffin by a mild oxidation reaction and are thus obtained as mixture associated with a large number of other oxygenated products. It has been known that the oxygenated products can be separated from the unconverted feed material by solvent extraction, but the separation of the mixture of oxygenated products into relatively pure individual components is extremely difficult. For example, cyclohexanol and cyclohexanone can be separated by fractionation but a large number of contacting stages are required and the presence of only minor amounts of impurities seriously interferes with the fractionation. These two components can, of course, be separated by chemical means but such methods are usually too expensive and cumbersome for the production of the desired product in large volume and at a reasonable cost.

It is the principal object of this invention to provide an improved method for separating alcohols and ketones having relatively close boiling points from admixtures of the same. It is also an object of this invention to provide a solvent which is selective for one of the components of a mixture of alcohols and ketones. It is also an object of this invention to provide a method for the separation of cyclohexanone from a mixture of cyclohexanone and cyclohexanol with a selective solvent. A further object of the invention is the provision of a solvent which is selective for cyclohexanol in the presence of cyclohexanone. Further objects and advantages will be apparent to one skilled in the art upon studying this disclosure, including the detailed description and the drawing.

Broadly, the present invention comprises contacting a mixture of a cyclic alcohol and a cyclic ketone with a selective solvent comprising a mixture of water and a polyhydroxy alcohol, or an ether or ester of a polyhydroxy alcohol, in a liquid-liquid extraction zone and therefrom recovering relatively purified raffinate and extract streams. These streams are then passed to further separation means to remove the solvent which is associated therewith. In a preferred embodiment the process can be operated to obtain the desired product, cyclohexanol for example, in a relatively pure state as the extract phase and to recover the cyclohexanone in a relatively impure state as the raffinate phase which can be recycled to a desired point in the process for the recovery of additional cyclohexanone. The solvent preferably contains about 40 weight percent diethylene glycol and about 60 weight percent water, and when using said solvent the cyclohexanol is selectively soluble in this solvent at temperatures in excess of about 83° F.

Figure 1:
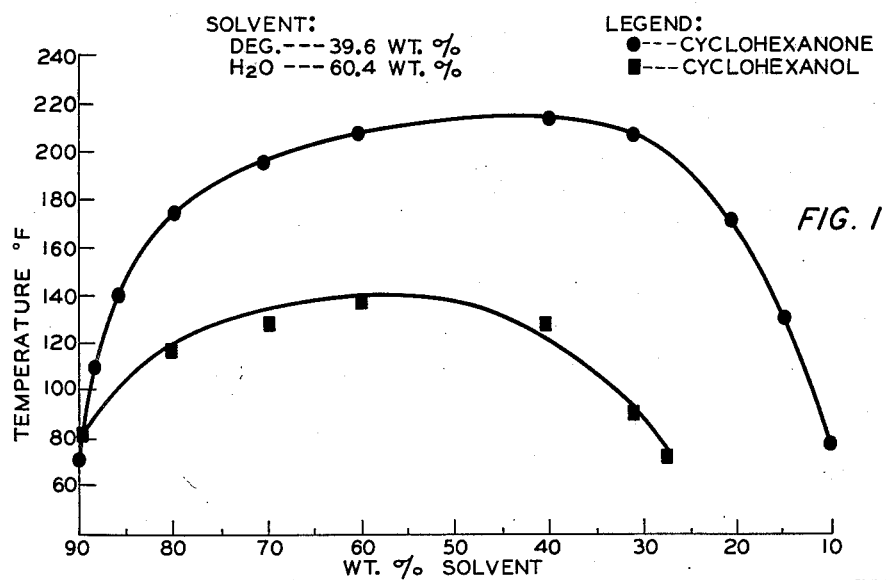

Figure 1 is a chart showing the solubility data of cyclohexanone and cyclohexanol in the solvent of this invention, and Figure 2 is a schematic flow diagram of a preferred embodiment of the invention.

Although the process is particularly applicable to the separation of mixtures of cyclohexanols and cyclohexanones obtained by the oxidation of the corresponding cycloparaffin, it is not limited thereto because the process is applicable to the preparation of such mixtures obtained from any source. Hydrocarbons which can be oxidized to produce the corresponding alcohol and ketone include cyclopentane and cyclohexane and alkyl derivatives thereof such as methylcyclopentane, dimethylcyclopentane, methylcyclohexane, ethylcyclohexane, methylethylcyclohexane, etc. Numerous other alkyl derivatives, wherein each alkyl radical contains not more than two carbon atoms, can also be used.

The solvent is a mixture of water and one or more oxygen-containing organic compounds which can be polyhydroxyl alcohol such as mono-, di-, tri-, and tetraethylene glycols; the ethers of these glycols such as methyl carbitol and methyl Cellosolve and esters of these glycols such as glycol monoacetate and glycol monoformate. The preferred solvent is a mixture of diethylene glycol and water which contains sufficient water to insure the formation of two phases in the extraction zone. Anhydrous diethylene glycol is miscible with cyclohexanol, cyclohexanone, or a mixture of the two in all proportions. It has been found that a mixture of about 40 weight percent diethylene glycol and 60 weight percent water is a particularly suitable solvent for the practice of the present invention.

For the recovery of a relatively pure alcohol stream, it is desirable that the feed stream contain primarily only the alcohol and corresponding ketone although the process is operable for feed streams which contain substantial amounts of impurities such as aldehydes, acids, etc. One means for producing a relatively pure mixture of cyclic ketone and its corresponding alcohol is described in copending application Serial No. 609,692, filed September 13, 1956, now U.S. Patent No. 2,931,834, by Willie W. Crouch and John C. Hillyer.

Referring now to Figure 1, the solubility data for cyclohexanone and cyclohexanol in a water-diethylene glycol solvent are illustrated graphically. These data were obtained by the cloud point solubility method. It can be seen that when the temperature is above about 83° F. cyclohexanol is more soluble than cyclohexanone in the solvent. These data show that with a solvent comprising about 60 weight percent water and about 40 weight percent diethylene glycol the preferred temperature range for selective extraction of cyclohexanol from a mixture of cyclohexanol and cycloheaxanone is between 100 and 135° F.

Figure 2 is a schematic flow diagram of a preferred embodiment of the present invention wherein various items of equipment such as pumps, motors, valves, and controls are not shown for the sake of simplicity; however, these items will be readily supplied by one skilled in the art.

Referring now to Figure 2, the feed stream comprising a mixture of cyclic alcohol and cyclic ketone such as a mixture of cyclohexanol and cyclohexanone is introduced via conduit 10 to extractor 11 which can be a conventional liquid-liquid extraction column such as a column containing a plurality of perforated horizontal plates positioned therein. Solvent flows downwardly from mixer 12 via conduit 13 to extractor 11. Mixer 12 is agitated such as by agitator 14 driven by motor 15. The solvent comprises, for example, a mixture of 60 weight percent water and 40 weight percent diethylene glycol. Make-up solvent is added to mixer 12 via conduit 16. Extractor 11 is operated liquid full at a temperature of about 122° F. and a pressure of about 10 p.s.i. Extract is removed from the bottom of extractor 11 via conduit 17 and is passed via pump 18 and heat exchanger 19 and conduit 20 to fractionator 21. Fractionator 21 can be a conventional distillation column such as a bubble tray column or a packed column. Heat is supplied to extractor 11 by means of heater 22 which can be a steam coil, electrical heater, or other conventional heating means. Raffinate is removed from extractor 11 via conduit 23, a portion being passed to mixer 12 via conduit 24 and the remainder being passed via conduit 25, pump 26, and heater 27 to fractionator 28. The overhead vapors from fractionator 21, comprising hydrocarbon and water vapors, pass via conduit 29 and condenser 30 to accumulator 31 wherein a phase separation occurs and water, which condenses from the mixture of hydrocarbons and water vapor, accumulates as the lower layer and is returned to fractionator 21 via conduit 32. The hydrocarbons form a layer on top of the water in phase accumulator 31 and are removed via conduit 33, a portion being taken off as cyclohexanol product via conduit 34 and another portion being returned to the bottom of extractor 11 via conduit 35 as reflux. Heat is supplied to fractionator 21 by means of heater 36. Diethylene glycol and water mixture is removed from the bottom of fractionator 21 via conduit 37.

The overhead vapors from fractionator 28, comprising hydrocarbon and water vapors, are passed via conduit 38 and condenser 39 to accumulator 40 wherein a phase separation occurs and water is returned to fractionator 28 via conduit 41. Hydrocarbons comprising cyclohexanone are removed overhead via conduit 42. Diethylene glycol and water mixture is removed from the bottom of fractionator 28 via conduit 43 and passed via pump 44, conduit 45 together with the diethylene glycol and water mixture from fractionator 21 via pump 46 and heat exchanger 19 wherein heat is given up to the extract via conduit 20 and thence passes via conduit 47 to mixer 12. Heat is supplied to fractionator 28 by means of heater 48. Make-up water can be added to the diethylene glycol and water mixture in conduit 47 by means of conduit 49 to maintain the ratio of water and diethylene glycol to that of the original solvent and the solvent is passed via conduit 50 to mixer 12.

The purity of the cyclohexanol removed via conduit 34 of Figure 2 will be dependent upon various variables including the composition of the feed, the number of contact stages of extractor 11, the temperature at which extractor 11 is operated, the composition of the solvent, and the ratio of solvent to hydrocarbon feed. The following specific embodiment of the invention will illustrate one preferred set of operating conditions; however, it should be understood that this example is intended to illustrate the invention and does not limit the invention.

*Example*

A feed stream consisting essentially of equal parts of cyclohexanol and cyclohexanone are fed via conduit 10 to extractor 11 at the rate of about 100 pounds per hour. Column 11 contains 38 theoretical stages and is operated at a temperature of 122° F. and a pressure of about 10 p.s.i. Solvent comprising 60 weight percent water and 40 weight percent diethylene glycol is added to mixer 12 via conduit 16 and conduit 50 at the rate of 1862½ pounds per hour. Solvent saturated with raffinate mixture present in mixer 12 passes via conduit 13 to extractor 11 at the rate of 2110%0 pounds per hour. Solvent-free reflux passes via conduit 35 into the bottom of extractor 11 at the rate of 407 pounds per hour which represents a reflux ratio based on solvent-free extract of 8.14 which is 1.5 times the minimum reflux ratio of 5.41 of extract to reflux. From extractor 11 via conduit 17 is removed 2309.5 pounds per hour of extract, which represents 457 pounds per hour of hydrocarbon and 1852.5 pounds per hour of solvent. This extract is heated in heat exchanger 19 and passed to fractionator 21 wherein a mixture of hydrocarbon vapor and water vapor is taken overhead via conduit 29, condensed in condenser 30 and passed to accumulator 31 where a phase separation occurs. The water is passed back to column 21 and the hydrocarbon is passed overhead via conduit 33 to furnish reflux passed through conduit 35 and the product which is removed via conduit 34. The product removed via conduit 34 comprises about 90 weight percent cyclohexanol and 10 weight percent cyclohexanone. This product is removed at this rate of about 50 pounds per hour.

Raffinate reflux at the rate of 248.4 pounds per hour passes into mixer 12 via conduit 24 and this represents a raffinate reflux of 4.14 product to reflux. Raffinate product is removed from distillation column 28 via conduit 42 at the rate of about 50 pounds per hour and this product comprises about 90 weight percent cyclohexanone, the remainder being cyclohexanol.

The solvent for separation of cyclohexanol from cyclohexanone is preferably one containing about 40 weight percent diethylene glycol and about 60 weight percent water; however, the solvent can contain from about 30 to about 50 weight percent diethylene glycol.

Reasonable variation and modifications are possible within the scope of the present disclosure without departing from the spirit and scope of the invention.

That which is claimed is:

1. A process for separating cyclic alcohols from admixture with the corresponding cyclic ketones, wherein said alcohols and ketones are selected from the group consisting of cyclohexanone, cyclohexanol, cyclopentanone, cyclopentanol and alkyl derivatives of same containing not more than 2 carbon atoms in the alkyl substituent, which comprises intimately contacting said mixture with a mixture of from about 50 to about 70 weight percent of water and from about 30 to about 50 weight percent of a polyhydroxyl alcohol selected from the group consisting of ethylene glycols having not more than 4 ethylene groups per molecule, monomethyl ethers of said glycols, monoacetic-esters, and monoformic-esters of said glycols, at a temperature in the range of about 100 to about 135° F.; recovering an extract phase comprising solvent and cyclic alcohol; and recovering said cyclic alcohol from said solvent.

2. A process for separating cyclohexanol from admixture with cyclohexanone which comprises intimately contacting said mixture with a mixture of from about 30 to about 50 weight percent of an ethylene glycol having not more than four ethylene groups per molecule and about 50 to about 70 weight percent water at a temperature in the range of about 100 to about 135° F.; recovering an extract phase comprising solvent and cyclohexanol and recovering said cyclohexanol from said solvent.

3. A process for separating cyclohexanol from admixture with cyclohexanone which comprises intimately contacting said mixture with a solvent comprising a mixture of about 60 weight percent water and about 40 weight percent diethylene glycol at a temperature in the range of about 100 to about 135° F.; recovering an extract phase comprising solvent and cyclohexanol; and recovering said cyclohexanol from said solvent.

4. A process for separating cyclohexanol from admixture with cyclohexanone which comprises passing said mixture to a liquid-liquid extraction zone; therein intimately contacting said mixture with a solvent comprising a mixture of about 60 weight percent water and about 40 weight percent diethylene glycol at a temperature in the range of about 100 to about 135° F.; withdrawing an extract phase from the bottom portion of said extraction zone; passing said extract phase to a first distillation zone; therein distilling said mixture so as to take a mixture of hydrocarbon and water vapor overhead; cooling and condensing said overhead stream so as to form a water phase and a hydrocarbon phase; returning said water phase to said first distillation zone; returning a portion of said hydrocarbon phase to the bottom of said liquid-liquid extraction zone as reflux; removing remaining hydrocarbon phase comprising essentially cyclohexanol as product of the process; removing a raffinate phase from the top of said liquid-liquid extraction zone; returning a portion of said raffinate to the top of said liquid-liquid extraction zone as reflux; passing the remaining portion of said raffinate to a second distillation zone; removing a mixture of hydrocarbons and water as overhead vapors from said second distillation zone; cooling and condensing said vapors so as to produce a water phase and a hydrocarbon phase; returning said water phase to said second distillation zone; removing said hydrocarbon phase as a product of the process; removing solvent from the bottom portion of said first and second distillation zones; and returning same to said liquid-liquid extraction zone.

5. A process for separating cyclic alcohols from admixture with the corresponding cyclic ketones, wherein said alcohols and ketones are selected from the group consisting of cyclohexanone, cyclohexanol, cyclopentanone, cyclopentanol and alkyl derivatives of same containing not more than 2 carbon atoms in the alkyl substituent, which comprises passing said mixture to a liquid-liquid extraction zone; therein intimately contacting said mixture with a solvent comprising a mixture of about 60 weight percent water and about 40 weight percent polyhydroxyl alcohol selected from the group consisting of ethylene glycols having not more than 4 ethylene groups per molecule, monomethyl ethers of said glycols, monoacetic-esters, and monoformic-esters of said glycols, at a temperature in the range of about 100 to about 135° F.; withdrawing an extract phase from the bottom portion of said extraction zone; passing said extract phase to a first distillation zone; therein distilling said mixture so as to take a mixture of hydrocarbon and water vapor overhead; cooling and condensing said overhead stream so as to form a water phase and a hydrocarbon phase; returning said water phase to said first distillation zone; returning a portion of said hydrocarbon phase to the bottom of said liquid-liquid extraction zone as reflux; removing remaining hydrocarbon phase comprising essentially cyclic alcohol as product of the process; removing a raffinate phase from the top of said liquid-liquid extraction zone; returning a portion of said raffinate to the top of said liquid-liquid extraction zone as reflux; passing the remaining portion of said raffinate to a second distillation zone; removing a mixture of hydrocarbons and water as overhead vapors from said second distillation zone; cooling and condensing said vapors so as to produce a water phase and a hydrocarbon phase; returning said water phase to said second distillation zone; removing said hydrocarbon phase as a product of the process; removing solvent from the bottom portion of said first and second distillation zones; and returning same to said liquid-liquid extraction zone.

References Cited in the file of this patent

UNITED STATES PATENTS 2,410,642     Farkas et al.            Nov. 5, 1946